United States Patent [19]

Meunier

[11] 3,907,956
[45] Sept. 23, 1975

[54] METHOD OF AGGLOMERATING GLASS BATCH MATERIALS IN A FLUIDIZED BED

[75] Inventor: Georges Meunier, Chalon-sur-Saone, France

[73] Assignee: Saint-Gobain Industries, Neuilly, France

[22] Filed: July 15, 1974

[21] Appl. No.: 488,793

[30] Foreign Application Priority Data
July 24, 1973 France .............................. 73.27022

[52] U.S. Cl. ..................... 264/117; 106/52; 106/84; 106/DIG. 8; 259/21; 264/82
[51] Int. Cl.² ..... B01J 2/16; C03C 1/02; C03C 3/04
[58] Field of Search ......... 264/117, 82; 106/DIG. 8, 106/52

[56] References Cited
UNITED STATES PATENTS

| | | |
|---|---|---|
| 3,350,213 | 10/1967 | Peyches ......................... 106/DIG. 8 |
| 3,503,790 | 3/1970 | Gringras ......................... 106/DIG. 8 |
| 3,529,979 | 9/1970 | Yarsa ............................. 106/DIG. 8 |
| 3,760,051 | 9/1973 | Eirich et al. .................... 106/DIG. 8 |
| 3,767,751 | 10/1973 | Simmingskold et al............. 264/117 |

*Primary Examiner*—Helen M. McCarthy
*Attorney, Agent, or Firm*—Pennie & Edmonds

[57] ABSTRACT

A method and an apparatus are described whereby a product is obtained which comprises particles containing agglomerated therein granules of sand, and optionally also of other glassmaking constituents, at least partially coated with and joined together by alkali metal metasilicate. The raw granules are fluidized in a bed of gas and homogeneously treated from within the bed with an aqueous solution of alkali metal hydroxide. The product has improved handling characteristics, having both low hygroscopicity and low friability.

12 Claims, 6 Drawing Figures

METHOD OF AGGLOMERATING GLASS BATCH MATERIALS IN A FLUIDIZED BED

BACKGROUND OF THE INVENTION

It is well known that in the manufacture of glass and related silicates, a mixture of silica sand and other raw materials is transformed into a homogeneous vitreous mass. Such other raw materials can comprise, for example, limestone, dolomite, sodium carbonate, sodium sulfate and feldspar.

In the fusing operations, difficulties arise from the fact that the surface of the sand granules is highly resistant to the requisite chemical attack by the other raw materials.

The surface resistance of raw sand granules gives rise to various types of heterogeneity in the vitreous mass. Heterogeneity can also be caused by volatility of certain of the raw materials, but in particular segregation can result from premature fusion, exemplarily of sodium carbonate and/or of silicates having low silica content such as can be formed as intermediates early in the fusing operation. Segregation can result also from the formation of low density substances such as various allotropic forms of quartz which tend to separate out of the mass by flotation.

These disadvantages can be diminished by separating the fusion operation into several stages, whereby volatile materials can be eliminated and the sand surface made more reactive before reaching the glass furnace. Thus, it has been proposed to carry out a preliminary step in which sand and sodium carbonate or sodium hydroxide are reacted to form an intermediate granular product composed of silica and sodium metasilicate.

In one embodiment of such prior art procedure, preheated sand is introduced at the top of a suitable reactor together with a concentrated solution of sodium hydroxide while hot gases are simultaneously introduced at the bottom of the reactor through a perforated plate, thus forming a fluidized bed. The operation of this fluidized bed is conventionally assisted by a rotating agitator equipped with blades.

The intermediate product obtained by this procedure of the prior art, sometimes termed a "presilicate," consists of grains or granules of silica which individually are substantially totally encased with a coating of sodium metasilicate. This structure tends to overcome the resistance of sand to subsequent chemical action in the glass melting furnace. However, this intermediate presilicate of the prior art has several deficiencies which interfere with its proper handling and storage.

On the one hand, it is highly friable and has poor resistance to grinding and abrasion, giving rise to dusts which are particularly injurious to human mucous membranes.

On the other hand, it can be very hygroscopic, tending to congeal on absorption of moisture from humid air. In regard to the latter deficiency, U.S. Pat. No. 3,529,979 discloses that a substantially non-hygroscopic product can be produced if any excess free NaOH is removed by reaction with carbon dioxide in the fluidizing gases. However, this then tends to make the dusting problem more acute in the case of such fine-particle products.

SUMMARY OF THE INVENTION

A means has now been found whereby the above-described difficulties can be surmounted and whereby a glassmaking precursor or presilicate composition can be produced which not only can be used advantageously in the glass melting furnace but which also can be handled much more conveniently and safely, having both low hygroscopicity and low friability, with a minimized tendency to produce dust.

The present invention provides a method for making an agglomerated composition for use in glassmaking, an apparatus for the performance of this method and new products which contain particles in which granules of sand, and optionally also of other glassmaking constituents, are agglomerated.

Briefly stated, said method comprises simultaneously (a) fluidizing, by means of a gas, a bed of preheated sand granules, (b) injecting from a distribution head located within the fluidized bed an aqueous solution of an alkali metal hydroxide and (c) mechanically agitating the fluidized bed at the level of said injecting step. Optionally, other glass-batch constituents, in pulverulent form, can also be added to the fluidized bed.

The apparatus of this invention comprises (a) a vessel conforming substantially to an upright cylinder, (b) a perforated diaphragm substantially extending across the interior of the vessel, (c) means to supply gas to the vessel below said diaphragm, (d) means to inject a liquid into the interior of the vessel above said diaphragm and (e) mechanical agitation means arranged within the vessel substantially at the level of said injection means.

The product of this invention comprises particles, each particle thereof containing agglomerated therein sand granules at least partially coated with and joined together by alkali metal silicate. When other glassmaking constituents are included in the fluidized bed together with the sand, the product comprises particles which contain conglomerated therein granules of sand and of the other constituents at least partially coated with and joined together by alkali metal metasilicate and other intermediate products.

DETAILED DESCRIPTION

When the method of this invention is performed on sand alone, the first step will be to prepare a fluidized bed of the sand in a suitable reactor such as a column having a perforated plate or grid at the bottom, through which a gas is forced in the conventional manner for forming a fluidized bed. There is then injected by spraying, preferably from multiple jets, from a point or points within the fluidized bed, into the midst of the fluidized bed, a hot caustic liquor, at a temperature higher than about 100°C. The caustic liquor is aqueous KOH or, preferably, NaOH at a concentration of about 40–70 percent, preferably 50–60 percent by weight. Distribution of the caustic liquor is preferably achieved with the help of a device which rotates in the fluidized bed. After a sufficient dwell time, the treated sand is removed from the reactor through an outlet pipe provided near the top surface of the fluidized bed.

When the caustic liquor is injected without additional suitable precautions, the injected liquor droplets will form with sand granules a viscous film-like "veil" separating the bed into two separate zones or strata, the zone below having higher temperature and the zone above having lower temperature. To prevent such occurrence and to obtain the desired homogeneity of the fluid bed, there is integrally associated with the injection device another device for the purpose of effecting a mechanical agitation at the level of the injection sufficient to break up the plastic-like and relatively tough veil. In this manner, the composition of the fluidized bed is homogenized to contain droplets of sprayed caustic liquor and granules of sand collided with caustic liquor, reacting therewith and being agglomerated thereby.

The minimum temperature permitting sand to react as desired with the caustic liquor is about 320°C., reaction being too slow at temperatures below this. At about 340°C., the reaction is very vigorous. Thus the temperature of the fluidized bed should be at least about 320°C., preferably at least about 340°C. In order to maintain the bed at the desired temperature level it is of course necessary to control the entering temperatures of the respective substances constituting the bed, namely the gas, the sand and the caustic liquor, as functions of their relative rates of inflow, the concentration of the caustic liquor and the ratio of silica to sodium oxide. This ratio, $SiO_2/Na_2O$ will be hereinafter designated as X. For common glass compositions, X has a value of about 5.1.

With respect to the heat input, there are practical limits which narrow the range of choice. Thus, the maximum temperature to which sand can be heated without fritting is about 860°C and the caustic liquor is advantageously held at 100°C when its concentration is equal or greater than 50 percent.

In order to attain a rapid speed of reaction, the temperature of the reaction between sand and exemplarily sodium hydroxide is raised to 360°C. Although the reaction occurs very rapidly at this temperature, there will remain a certain amount of unreacted free sodium hydroxide. In the case where the gases used for fluidizing the bed are hot gases of combustion, the sodium hydroxide reacts with the $CO_2$ in these gases to form $Na_2CO_3$. Surprisingly, in the agglomerated product of this invention, this does not cause a dust problem. If hot air is used instead, preheated in a heat exchanger, the excess sodium hydroxide will remain as such in the resulting presilicate.

In practice, in order to obtain a presilicate having a ratio X equal to about 5.3, the temperature of the hot gases will be between 750°C and 850°C, depending on other parameters of operation.

Contrary to the experience of prior art, the product of the present invention can be fused with other glass batch materials in the glass furnace to produce suitable glass composition without being subject to segregation.

It has moreover been ascertained that the use of presilicate according to this invention can effect a reduction in fuel requirements by about 10 percent and can increase the output of the glass furnace by about 15 percent.

Other advantages of the new glassmaking precursor of the invention include the following:

The new product contains only 0.5 to 2 percent of fines having a diameter of 0.125 millimeters or less, and about 60 percent of the product is made up of particles having a diameter between 0.4 and 0.8 millimeters.

The new product has an apparent density (bulk density) between 1.0 and 1.1, as compared to the conventional 1.5 of the prior art.

The low apparent density and the low proportion of fines make the product easy to fluidize if needed in subsequent operations.

The new product is less friable than products of the prior art, being more resistant to grinding and abrasion. This fact combined with the low percentage of fines makes the product less prone to dusting and substantially more safe for handling without danger to the mucous membranes of personnel.

Furthermore, the new product is less hygroscopic than products of the prior art. Any bulk cohesion resulting from exposure to moist air is easy to break up in the ordinary mixing operations which occur in, or preliminary to, introduction into, the glass furnace.

In contrast to known processes, the present method can be modified, as above described, by the inclusion of other glassbatch constituents directly in the fluidized bed whereby these are conglomerated with the sand granules, the pulverized particles of said other constituents and the sand granules being joined together and at least partially coated by sodium metasilicate and other intermediate products. The particles of such products vary typically in state of aggregation from particles containing only 2 or 3 granules of sand or other constituents to up to about 100 of such granules or pulverized particles.

When making such a composite glass batch precursor, it is preferable to introduce the additional ingredients as well as the sand to the fluidized bed at elevated temperature. Proceeding in such manner achieves an increase in production which can amount to 30 percent or higher than when the other ingredients are added cold. Heating is preferably carried out in an upper region above the reactor.

If the other glass-batch ingredients are added to the fluidized bed at low temperature there must be a compensating heating of the fluidizing gas. Thus when this gas is the result of combustion of a fuel gas, the quantity of fuel used may have to be increased by about 35 percent, in order to maintain the fluidized bed at the temperature necessary for the desired rate of reaction between sand and sodium hydroxide.

The glass-batch ingredients used together with sand are advantageously pulverized as customary to an average particle diameter between 0.1 and 2 mm.

There are thus two general ways of exploiting the present invention. It is possible, as described further above, to make an agglomerated presilicate with sand alone and mix this with the other ingredients in conventional mixers at the location of the glass furnace. Or alternatively, a conglomerate precursor can be made whose particles contain granules of sand and also of pulverized granules of all or part of the other glassmaking ingredients, optionally in the conventional proportions for glassmaking. As will be apparent to those skilled in the art of glassmaking, combination of the two approaches can be made in order to obtain variations in the relative proportions of the components of the glass batch composition.

In any of these manifestations, the product containing agglomerates can be delivered first to storage or, alternatively, means can be provided for conveying the product directly to the location of the glass furnace. In the latter case, an advantageous saving in fuel costs can be achieved by delivering the hot product of this invention directly to the glass furnace.

When the product of this invention is based on sand alone, and subsequently mixed with the other ingredients to make the glass batch, the mixture is easily homogenizable without large lumps which would resist normal treatment in the glass furnace.

Preparing the complete glass batch in the fluidized bed possesses additional advantages. The precursor product contains fewer fines and is more homogeneous. Handling steps are simplified particularly when a storage step is by-passed and the precursor is conveyed directly to the furnace, optionally by fluidization.

Compositions obtained after mixing show granules whose dimensions are for the most part between 0.15 and 1.5 mm.

BRIEF DESCRIPTION OF THE DRAWINGS

The invention will now be further described in terms of a number of presently preferred embodiments of the apparatus thereof and in terms of the presently preferred practice of the operation thereof by reference to the accompanying drawings in which:

Referring to FIG. 1, the apparatus of the invention there illustrated comprises essentially a heat insulated tower 1 which serves to heat the grains of sand by means of hot gases and a reactor vessel 2 whose function is to cause the heated sand to react in a fluidized bed with droplets of the caustic liquor or caustic soda solution.

Figure 1:
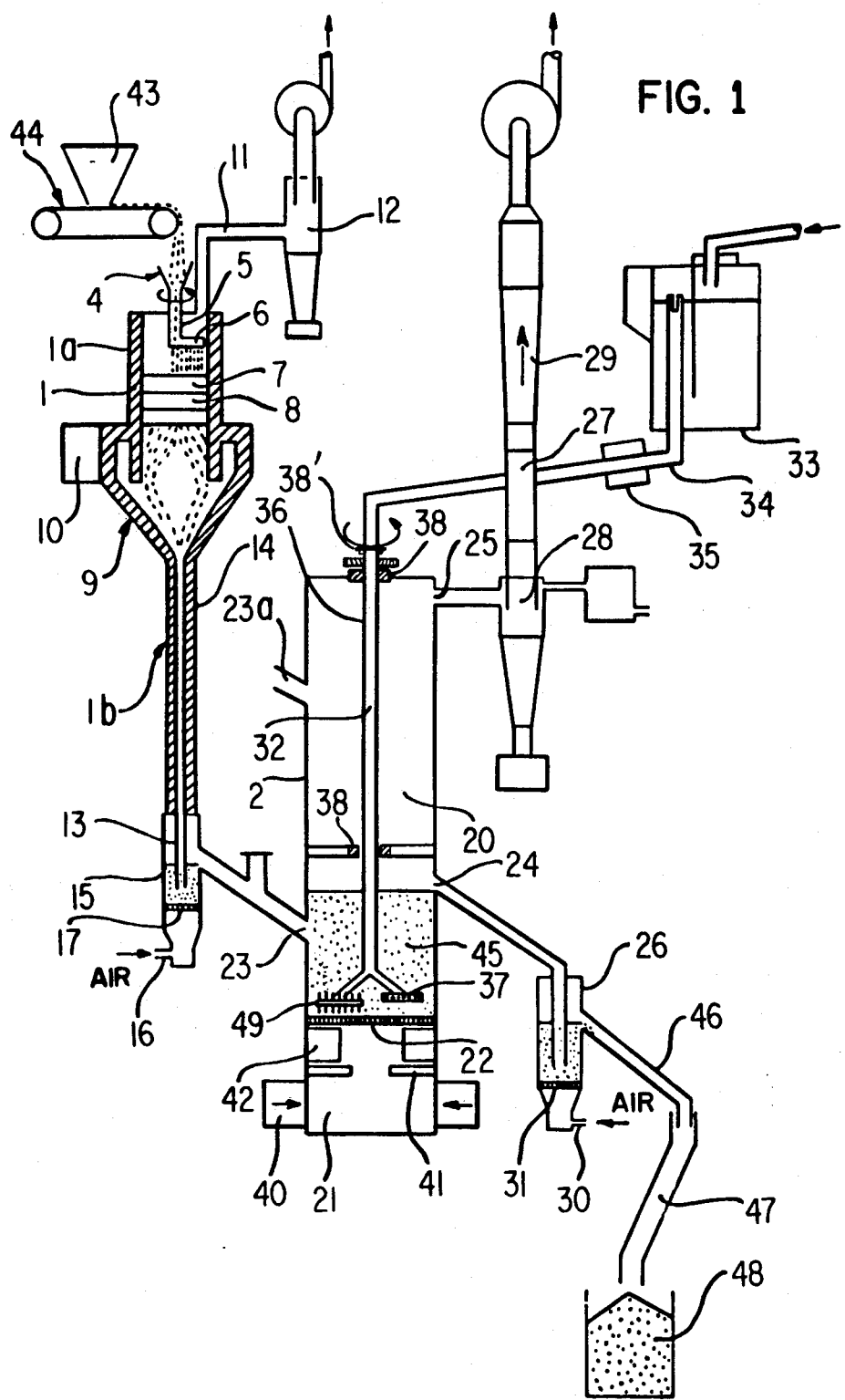
FIG. 1 is a schematic diagram of an assemblage of apparatus in accordance with the invention.

The heating tower 1 includes at its upper end 1a a rotating sand distributor which distributes dry sand for example through a funnel 4. This distributor communicates with a tube 5 and a perforated distribution head 6 which are mounted for rotation within the tower. This distributor 6 is pierced with a slot which is made of variable shape and section according to the speed at which the sand is to pass through it.

Beneath the tube 5 and the perforated plate are disposed ring-shaped packings 7 and 8, which may for example be made of turnings of refractory steel or the like. These packings are disposed at the top of a feeding chamber 9 to which is fed heated air, heated gases or heated products of combustion from a burner 10, which may be associated with a heat exchanger not shown. A pipe 11 connected to the upper end of the tower makes it possible for the products of combustion to pass to a dust recovery device 12 exemplarily of cyclone type, before being rejected to the atmosphere.

The lower portion 1b of the tower comprises a narrow tube 13 having a heat-insulating coating 14 which opens into an input siphon 15 where the heated sand is fluidized by means of air or gas arriving through a tube 16 below a porous or perforated plate 17.

The reactor 2 is divided into a reaction chamber 20 and a wind box 21 by means of a grid or perforated or porous plate 22.

To the reaction chamber there are connected lines 23, 24 and 25 which communicate with the sand inlet siphon 15 to an outlet siphon 26 for the finished product and to a dust recovery device 27 including a cyclone 28 and a wet scrubber 29.

The outlet siphon 26 which may be similar to the inlet siphon is provided like the latter with a pipe 30 for the arrival of air or gas beneath a porous or perforated plate 31. It is important to notice that the branching point 23 is disposed above the grid 32 but below the branching point 24 which in turn is below the branching point 25. It has moreover been observed that it is possible to introduce the sand at a higher point indicated by the entry 23A.

In order to introduce the droplets of caustic liquor in the chamber 20 a rotating distributor 32 is affixed to the reactor 2 and is fed with caustic liquor solution from a reservoir 33 made for example of nickel and via a pipe 34 including a heating element 35 which may be electric in nature. The distributor 32 comprises a tube 36, a perforated pipe-shaped distributing head 37 and a device 49 here shown as a rake which is capable of breaking up the film or veil which tends to form in the fluidized bed. These elements are mounted by bearings 38 on the reactor 2 with the aid of a rotating joint 38' and are in turn rotated with the help of a suitable motor not shown. It will be observed that the distributing head 37 is disposed between the branch point 24 and the grid 22. See in this connection FIG. 2.

Below the grid 22 there is disposed the wind box 21 fed with gas under pressure by a device 40. In order to insure a good distribution of gas beneath the grid this wind box is advantageously provided with a diaphragm 41 and with blades 42, the device 40 surrounding the wind box in a manner so as to permit or effect a tangential flow of gas. The gas set into motion in the diaphragm 41 thereafter spreads out beneath the grid in a current whose continued rotation is prevented by the blades 42.

It is possible to dispense with the siphons 15 and 26 by connecting the lower portion 1b of the heating tower and the line 46 to the reactor. The input siphon 15 is not indispensible even though it forms a barrier which prevents rise of the droplets or vapor of the caustic liquor into the tube 13 and into the heating tower 1. The outlet siphon 26 is likewise not indispensible although it makes it possible to homogenize the product emerging from the reactor through the conduit 24. The product tends to become enriched in sodium hydroxide when the pipe 37 of the distributor is at the same level as the connection to the line 24.

To supply sand to the reactor it is also possible to use an insulated tower provided with grids or plates which are perforated and some of which support a packing as described hereinbelow with reference to FIG. 5.

The operation of the apparatus thus far described is as follows: the rotating distributor is continuously fed with dry sand by suitable means such as for example a hopper 43, a carrying belt 44 leading to the funnel 4. The slot through the rotating plate 6 makes it possible to distribute the sand in a uniform layer on the packing 7 and then on the packing 8 where the sand encounters the hot gases rising from the burner 10 toward the outlet 11 and thus recovery unit 12. The sand which is thus in counter-current flow with the flow of gas therefore flows after being heated through the tube 13 into the input siphon 15 where it is fluidized by action of the air or gas arriving through the porous plate 17. This siphon continuously overflows into the conduit 23 or conduit 23A and into the reaction chamber 20 where the heated grains of sand are brought into contact with the drops of the alkaline solution emerging from the perforated plate 37 of the rotating distributor 32. Under action of the current of gas passing through the grid 22 the sand grains and the droplets of caustic liquor form a fluidized bed 45 where the (exemplarily) sodium hydroxide reacts on the sand producing an intermediate product for the manufacture of glass or silicates. The product continuously overflows into the conduit 24 and the outlet siphon 26 and into a further conduit 46 communicating with the siphon, a throttling aperture 47 which delivers the product into a receptable 48. It will be observed that the fluidized bed 45 extends between the grid 22 and the point of connection to the branch conduit 24 of the chamber 20 in the reactor 2. The result is that the heated sand and the droplets of caustic liquor which emerge respectively from the conduit 23 and the perforated head 37 are brought into the midst of the fluidized bed 45, this head itself being immersed in the fluidized bed.

Figure 2:
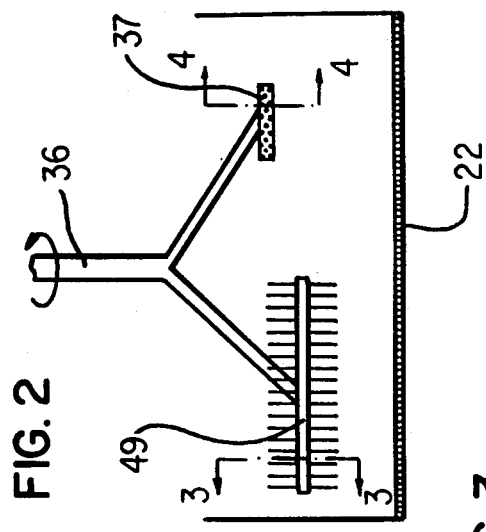
FIG. 2 is a diagramatic representation of a distributing device forming part of the apparatus of FIG. 1.

FIG. 2 represents a particular form of construction for the distributor of liquid solution. In this construction which is exemplary only, the apparatus intended to prevent formation of the film takes the form of a rake. An advantageous position for the teeth has been indicated in FIG. 3 where the arrow indicates a sense of rotation.

Figure 4:
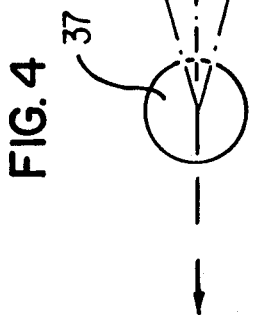
FIG. 4 shows a section of the distributing head perforated with a row of holes serving to distribute the caustic liquor.

The distributing head 37 is provided with holes on the side opposite to the direction of rotation so as to inject the caustic liquor into the fluidized mass. FIG. 4 shows a section of the distributing head illustrating an advantageous formation in which the holes are located in a row. These holes are preferably disposed in a plurality of rows.

It would obviously be possible to construct this plate in a different form. The form indicated is exemplary only. The introduction of the fluid into the heart of the fluidized bed is however a characteristic feature of the invention.

The speed of rotation of the distributor is not critical. It can normally amount to some 10 to 45 revolutions per minute.

Tests have shown that it is advantageous when employing a distributor such as that which has been illustrated in the drawings to dispose the perforated pipe or other element for introduction of the liquid solution in the vicinity of the lower grid for example at some four to six centimeters therefrom in the case of the cylindrical reactor 80 centimeters in diameter.

Figure 5:
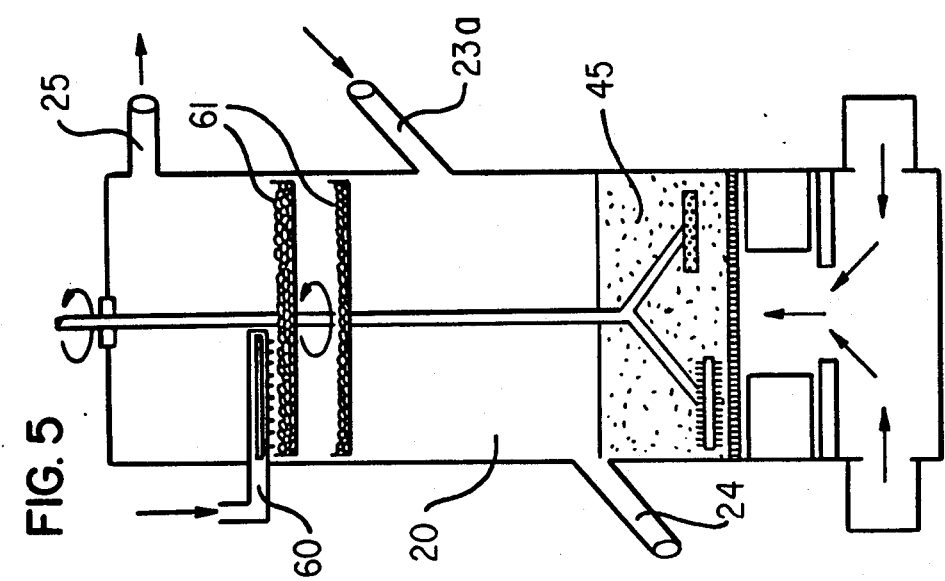
FIG. 5 is a schematic representation of a reactor according to the invention for the production of a glass-batch composition.

FIG. 5 shows the reactor provided with shelves 61 for heating the complemental materials before introducing them into the fluidized bed. A conduit 60 is provided carrying the complemental materials to the reaction chamber 20 above the shelves 61.

Figure 6:
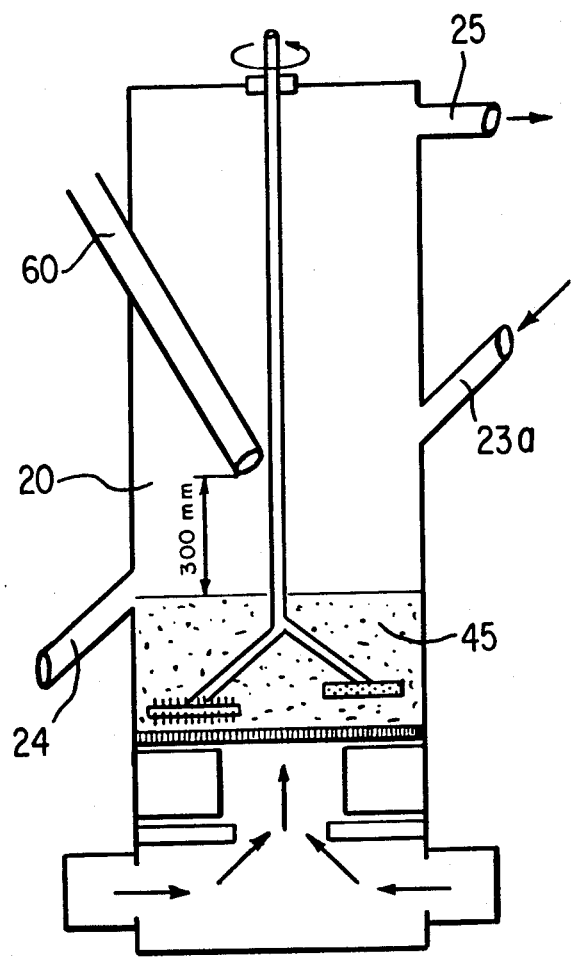
FIG. 6 is a schematic representation of a different reactor according to the invention for the production of a glass-batch composition, said reactor being a modification other than that of FIG. 5.

If the complemental materials are introduced cold into the fluidized bed 45 (FIG. 6) the conduit 60 has its opening in the reaction chamber 20 at a point located advantageously at about 0.30 meters above the bed, the diameter of the cylindrical reactor, as previously recited, being equal to 80 centimeters.

The complemental materials can be introduced hot or cold to the reaction chamber, but in either case the complete glass composition discharges hot through emptying conduit 24. The hot glass-batch composition can be directly supplied to the glass furnace, continuously and without intermediate storage, optionally by fluidization or pneumatic transportation, by prolonging conduit 24 up to the glass furnace.

A number of examples of the invention will now be described. These examples have been carried out with a tower 1 having a height of 2.8 meters and a maximum diameter of 1.7 meters and provided in the upper packing 7 with rings, available commercially under the mark "PALL," having a thickness of 5 centimeters and a lower packing 8 likewise made up of such rings having a thickness of 15 centimeters. The inlet siphon 15 and the outlet siphon 16 received a fluidizing air current of 7 cubic meters per hour.

The reactor 2 is of generally cylindrical form had a height of about four meters at an internal diameter of 80 centimeters corresponding to a cross section of 0.5 square meters. The fluidized bed 45 had a thickness of 50 centimeters. The wind box was provided with a diagram 41 having a thickness of 60 millimeters pierced with a circular opening of 200 millimeter diameter and with six rectangular blades 42 having a height and width of 400 and 240 millimeters respectively.

Figure 3:
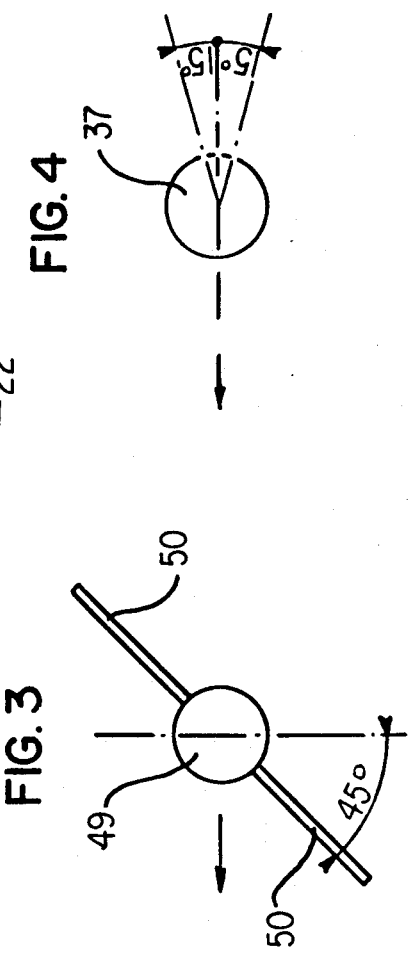
FIG. 3 indicates a possible or desirable form for the mixing mechanical mixer.

The caustic liquor employed, containing 50 percent by weight of sodium hydroxide, was heated to a temperature of 100°C. by means of an electric heater 35. A rotating distributor as shown in FIGS. 2, 3 and 4 was employed rotating at a speed between 10 and 45 rpm. The injection pipe was disposed five centimeters above the bottom grid. In all of the examples the sand employed was from Roncevaux, the grains having a diameter less than about 0.5 millimeters.

EXAMPLE 1

Table I hereinafter gives the reaction conditions, that is to say the flow rates for sand and gas, the temperature of these raw materials and the temperature at a central point in the fluidized bed. The theoretical ratio of X as given in the last column, signifies the weight ratio of silica $SiO_2$ to $Na_2O$ introduced into the reactor. The test lasted for seven hours.

There were introduced into the wind box the products of combustion resulting from burning of natural gas from the Lacq Field containing methane. The output indicated in the table is the consumption of $CH_4$ in the burners.

It was observed that the $CO_2$ present in the products of combustion was completely absorbed by the sodium hydroxide.

TABLE I

| TIME | SAND | | CAUSTIC LIQUOR 50% | GAS | TEMPERATURES °C | | RATIO |
|---|---|---|---|---|---|---|---|
| HOURS | RATE | TEMP. | RATE | RATE | GAS | REACTION | X |
| | kg/hr | C° | kg/hr | m³/hr | | | |
| 1 | 790 | 820 | 392 | 11 | 770 | 380 | 5.2 |

TABLE I—Continued

| TIME | SAND | | CAUSTIC LIQUOR 50% | GAS | TEMPERATURES °C | | RATIO |
|---|---|---|---|---|---|---|---|
| HOURS | RATE | TEMP. | RATE | RATE | GAS | REACTION | X |
| | kg/hr | C° | kg/hr | m³/hr | | | |
| 2 | 790 | 820 | 392 | 11 | 755 | 390 | 5,2 |
| 3 | 877 | 830 | 438 | 12 | 800 | 370 | 5,1 |
| 4 | 877 | 850 | 438 | 12 | 810 | 375 | 5,1 |
| 5 | 877 | 830 | 438 | 12 | 810 | 380 | 5,1 |
| 6 | 955 | 845 | 481 | 14 | 770 | 380 | 5,1 |
| 7 | 1120 | 835 | 562 | 14 | 770 | 370 | 5,1 |

At the end of the test there were recovered 1,465 kilograms per hour of a presilicate. The product contained from 0.2 to 0.5 percent of agglomerates in the diameter of more than 5 millimeters.

EXAMPLE 2

In the same fashion as hereinabove set forth for Example 1, there are set forth in Table II below the operating conditions for a seven-hour test intended to produce an intermediate product having a theoretical ratio X between 3 and 3.8. The feed with hot gases was as in Example 1.

TABLE II

| TIME | SAND | | CAUSTIC LIQUOR 50% | GAS | TEMPERATURES °C | | RATIO |
|---|---|---|---|---|---|---|---|
| HOURS | RATE | TEMP. | RATE | RATE | GAS | REACTION | X |
| | kg/hr | C° | kg/hr | m³/hr | | | |
| 1 | 519 | 805 | 348 | 15 | 815 | 395 | 3,8 |
| 2 | 519 | 800 | 348 | 15 | 810 | 390 | 3,8 |
| 3 | 519 | 835 | 389 | 15 | 815 | 375 | 3,4 |
| 4 | 519 | 827 | 428 | 16 | 805 | 355 | 3,1 |
| 5 | 519 | 825 | 428 | 16 | 825 | 360 | 3,1 |
| 6 | 540 | 830 | 435 | 17 | 810 | 355 | 3,2 |
| 7 | 540 | 830 | 458 | 19 | 820 | 360 | 3,0 |

At the end of the test there were obtained 770 kilograms per hour of a presilicate having a ratio X of about 3.

2 percent of the agglomerates were at the end of the test at a diameter exceeding 5 millimeters.

In the case of these two examples Debye-Scherrer X-ray diffraction analysis, providing "powder diagrams," established that the obtained intermediate product contained quartz and sodium metasilicate in large quantities and sodium carbonate in small quantity.

EXAMPLE 3

In this example, cold air was used as fluidizing gas. It was therefore necessary to operate with a lower input of sodium hydroxide solution than in the preceeding examples in order to effect a satisfactory reaction of the injected alkali with the sand at the lower temperature. The ratio X is correspondingly higher than in the preceeding examples. The conditions of this example are set forth in Table III.

TABLE III

| TIME | SAND | | CAUSTIC LIQUOR 50% | AIR | REACTION TEMP. | RATIO |
|---|---|---|---|---|---|---|
| HOURS | RATE kg/hr | TEMP. C° | RATE kg/hr | RATE m³/hr | C° | X |
| 1 | 500 | 820 | 146 | 96 | 340 | 8,9 |
| 2 | 500 | 820 | 158 | 96 | 330 | 8,2 |
| 3 | 500 | 820 | 158 | 96 | 345 | 8,2 |

EXAMPLE 4

In this example, a glass-batch composition was prepared with introduction of the supplemental products, i.e. the other ingredients used besides sand, in cold condition to the fluidized bed. These products were first mixed in the following proportions:

| | Kilograms |
|---|---|
| Sodium Carbonate | 11.4 |
| Limestone | 192 |
| Dolomite | 270 |
| Feldspar | 81.6 |
| Water | 1.5 |

With the aid of a volumetric dispenser these products were introduced into the reactor through a tube disposed inside the reactor the lower opening of which was about 30 centimeters above the fluidized bed. The operating conditions are set forth in Table IV.

TABLE IV

| TIME | SAND | | CAUSTIC LIQUOR 50% | SUBSIDIARY MATERIALS | GAS | | TEMPERATURES °C | | |
|---|---|---|---|---|---|---|---|---|---|
| HOURS | RATE kg/hr | TEMP °C | RATE kg/hr | RATE kg/hr | RATE m³/hr | AT THE GRID | FLUIDIZED BED | EXITING PRODUCT | EXITING GAS |
| 1 | 816 | 830 | 389 | 0 | 14 | 795 | 400 | 400 | 330 |
| 2 | 816 | 840 | 389 | 0 | 14 | 805 | 400 | 390 | 335 |
| 3 | 790 | 820 | 389 | 324 | 19 | 820 | 390 | 390 | 350 |
| 4 | 790 | 800 | 389 | 324 | 19 | 815 | 385 | 390 | 350 |
| 5 | 790 | 800 | 389 | 324 | 19 | 815 | 390 | 390 | 350 |
| 6 | 800 | 800 | 389 | 324 | 19 | 820 | 390 | 390 | 350 |

There were thus produced about 1,300 kilograms per hour of total product. As in Examples 1 and 2, the flow of fluidizing gas is expressed as the rate of supply of natural (Lacq) combustion gas before burning.

In this example the throughput is higher than in Examples 1 and 2 in which the conditions were otherwise the same. This is necessary in order to supply the supplementary calories to compensate for absorption of heat by the complemental ingredients which were introduced cold. This increase in heat requirement amounted to about 35 percent.

The product obtained included about 1 to 2 percent agglomerates having a diameter larger than 5 millimeters.

Size distribution studies were made on a conventional type of glass-batch obtained by mechanical mixing and on a corresponding composition prepared totally in the continuous fluidized bed method of this invention. The results of these studies present significant differences in the compared size-distribution curves. In the presilicate precursor of the instant invention, 20 to 25 percent of the particles have an average diameter greater than 1 millimeter, compared to only 2 to 3 percent in the case of the conventional product. Furthermore, 50 percent of the particles in the precursor product are greater than 0.6 mm. whereas in the prior art mixture 50 percent of the particles are greater than 0.2 mm.

EXAMPLE 5

The composition and procedure of Example 4 were repeated except that the supplemental materials were added hot to the fluidized bed and the reactor used corresponded to the representation in FIG. 5. The ratio X of the presilicate was equal to 5.3.

The supplemental materials were heated in two shelves or levels of PALL rings which were integral with the outside of pipe distributing the caustic liquor. The materials thus heated were allowed to fall as a shower into the fluidized bed.

The operating conditions are summarized in Table V.

TABLE V

| TIME HOURS | SAND RATE kg/hr | SAND TEMP °C | CAUSTIC LIQUOR 50% RATE kg/hr | SUBSIDIARY MATERIALS RATE kg/hr | GAS RATE m³/hr | TEMPERATURES °C | | |
|---|---|---|---|---|---|---|---|---|
| | | | | | | AT THE GRID | FLUIDIZED BED | EXITING PRODUCT | EXITING GAS |
| 1 | 800 | 820 | 389 | 0 | 14 | 780 | 390 | 390 | 340 |
| 2 | 800 | 830 | 389 | 0 | 14 | 790 | 380 | 390 | 340 |
| 3 | 800 | 810 | 389 | 360 | 14 | 810 | 380 | 390 | 240 |
| 4 | 800 | 800 | 389 | 360 | 14 | 820 | 380 | 380 | 230 |
| 5 | 800 | 800 | 389 | 360 | 14 | 820 | 380 | 390 | 240 |

What is claimed is:

1. Method for making an agglomerated composition for use in glassmaking which method comprises simultaneously
   a. fluidizing, by means of a gas, a bed of preheated sand granules,
   b. injecting from a distribution head located within the fluidized bed an aqueous solution of an alkali metal hydroxide and
   c. mechanically agitating the fluidized bed at the level of said injecting step by means of a rotating raking device, the reaction temperature of said fluidized bed being at least 320°C and up to about 400°C.

2. The method of claim 1 wherein the fluidized bed is composed substantially of sand granules.

3. The method of claim 1 wherein the fluidized bed contains also pulverized granules of other glass batch constituents.

4. The method of claim 3 wherein the glass batch constituents comprise sodium carbonate, limestone, feldspar and dolomite.

5. The method of claim 3 wherein the hot sand and said other constituents are separately introduced into the bed.

6. The method of claim 1 wherein the sand is heated to about 750°–850° C. before being introduced into the fluidized bed.

7. The method of claim 3 wherein said other constituents are heated before being introduced into the fluidized bed.

8. The method of claim 7 wherein said other constituents are heated in the hot gases rising above the fluidized bed.

9. The method of claim 1 wherein the aqueous hydroxide solution contains at least about 50 percent by weight of sodium hydroxide.

10. The method of claim 1 wherein the hydroxide solution is preheated to at least about 100° C.

11. The method of claim 1 wherein the hot gas is supplied to the fluidized bed at a temperature about 750°–850° C.

12. The method of claim 1 wherein said gas comprises hot combustion gases containing carbon dioxide.

* * * * *